US011595341B2

(12) United States Patent
Hirota et al.

(10) Patent No.: US 11,595,341 B2
(45) Date of Patent: Feb. 28, 2023

(54) NON-TRANSITORY COMPUTER-READABLE RECORDING MEDIUM, ESTIMATION METHOD, AND INFORMATION PROCESSING DEVICE

(71) Applicant: FUJITSU LIMITED, Kawasaki (JP)

(72) Inventors: Naoya Hirota, Nagoya (JP); Yukihiro Takeuchi, Akashi (JP); Hiroshi Iyobe, Yokohama (JP); Shoichi Kogiso, Nagoya (JP); Yuji Aoki, Nagoya (JP); Masahiro Shimomura, Nagoya (JP); Takashi Ikezaki, Yatomi (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/474,201

(22) Filed: Sep. 14, 2021

(65) Prior Publication Data

US 2022/0174029 A1  Jun. 2, 2022

(30) Foreign Application Priority Data

Nov. 27, 2020 (JP) .............................. JP2020-197099

(51) Int. Cl.
*G06F 15/16* (2006.01)
*H04L 51/214* (2022.01)
*G06F 16/33* (2019.01)
*H04L 51/02* (2022.01)

(52) U.S. Cl.
CPC ........ *H04L 51/214* (2022.05); *G06F 16/3331* (2019.01); *H04L 51/02* (2013.01)

(58) Field of Classification Search
CPC .... H04L 51/214; H04L 51/02; G06F 16/3331
USPC .......................................................... 709/206
See application file for complete search history.

(56) References Cited

U.S. PATENT DOCUMENTS

| 6,356,633 B1* | 3/2002 | Armstrong ............ H04L 51/214 379/265.09 |
| 11,088,982 B1* | 8/2021 | Agarwal ............... H04L 51/212 |
| 2014/0195184 A1 | 7/2014 | Maeda et al. |
| 2019/0158610 A1* | 5/2019 | Holzband ............... H04L 51/52 |
| 2021/0176198 A1* | 6/2021 | Cudak .................... H04L 51/48 |

FOREIGN PATENT DOCUMENTS

| JP | 2009-31810 A | 2/2009 |
| JP | 2013-41448 A | 2/2013 |

* cited by examiner

*Primary Examiner* — Imad Hussain
(74) *Attorney, Agent, or Firm* — WHDA, LLP

(57) ABSTRACT

A non-transitory computer-readable recording medium storing an estimation program that causes a processor included in a computer to execute a process. The process includes receiving a message of an estimation target of a forwarding destination, searching past messages for a message similar to the received message, estimating, when there is no similar message among the past massage, the forwarding destination of the message using a model of estimating the forwarding destination based on a keyword that is identified based on a word included in the received message, and outputting a forwarding destination of the searched similar message or the estimated forwarding destination.

15 Claims, 17 Drawing Sheets

FIG. 2A

| message | recommend | label | key1 | key2 | key3 |
|---|---|---|---|---|---|
| abc | MAKE INQUIRY TO DEPARTMENT A | 1 | a | b | |
| def | MAKE INQUIRY TO DEPARTMENT B | 2 | d | | |
| ghi | MAKE INQUIRY TO DEPARTMENT C | 3 | g | h | i |
| jkl | MAKE INQUIRY TO DEPARTMENT D | 4 | l | | |
| mno | MAKE INQUIRY TO DEPARTMENT E | 5 | n | o | |
| pqr | MAKE INQUIRY TO DEPARTMENT F | 6 | q | | |
| stu | MAKE INQUIRY TO DEPARTMENT G | 7 | s | u | |
| vwx | NO HANDLING REQUIRED | 8 | v | | |
| yz | UNKNOWN | 9 | y | z | |
| ... | ... | ... | ... | ... | ... |

| No | keyword |
|---|---|
| 1 | a |
| 2 | b |
| 3 | d |
| 4 | g |
| 5 | h |
| 6 | i |
| 7 | l |
| 8 | n |
| 9 | o |
| 10 | q |
| 11 | s |
| 12 | u |
| 13 | v |
| 14 | y |
| 15 | z |
| ... | ... |

123

| No | notkeyword |
|---|---|
| 1 | c |
| 2 | e |
| 3 | f |
| 4 | j |
| 5 | k |
| 6 | m |
| 7 | p |
| 8 | r |
| 9 | t |
| 10 | w |
| 11 | x |
| ... | ... |

FIG. 2C

| message | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 |
|---|---|---|---|---|---|---|---|---|---|---|---|---|---|---|---|---|---|---|---|---|---|---|---|---|---|---|
| abc | 1 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| def | 0 | 0 | 0 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| ghi | 0 | 0 | 0 | 0 | 0 | 0 | 1 | 1 | 1 | 0 | 0 | 0 | 0 | 0 | 0 | 0 | 0 | 0 | 0 | 0 | 0 | 0 | 0 | 0 | 0 | 0 |
| jkl | 0 | 0 | 0 | 0 | 0 | 0 | 0 | 0 | 0 | 0 | 1 | 0 | 0 | 0 | 0 | 0 | 0 | 0 | 0 | 0 | 0 | 0 | 0 | 0 | 0 | 0 |
| mno | 0 | 0 | 0 | 0 | 0 | 0 | 0 | 0 | 0 | 0 | 0 | 0 | 1 | 1 | 0 | 0 | 0 | 0 | 0 | 0 | 0 | 0 | 0 | 0 | 0 | 0 |
| pqr | 0 | 0 | 0 | 0 | 0 | 0 | 0 | 0 | 0 | 0 | 0 | 0 | 0 | 0 | 0 | 1 | 0 | 0 | 0 | 0 | 0 | 0 | 0 | 0 | 0 | 0 |
| stu | 0 | 0 | 0 | 0 | 0 | 0 | 0 | 0 | 0 | 0 | 0 | 0 | 0 | 0 | 0 | 0 | 0 | 1 | 0 | 1 | 0 | 0 | 0 | 0 | 0 | 0 |
| vwx | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 0 | 0 | 0 | 0 |
| yz | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 1 |
| ... | ... | ... | ... | ... | ... | ... | ... | ... | ... | ... | ... | ... | ... | ... | ... | ... | ... | ... | ... | ... | ... | ... | ... | ... | ... | ... |

124

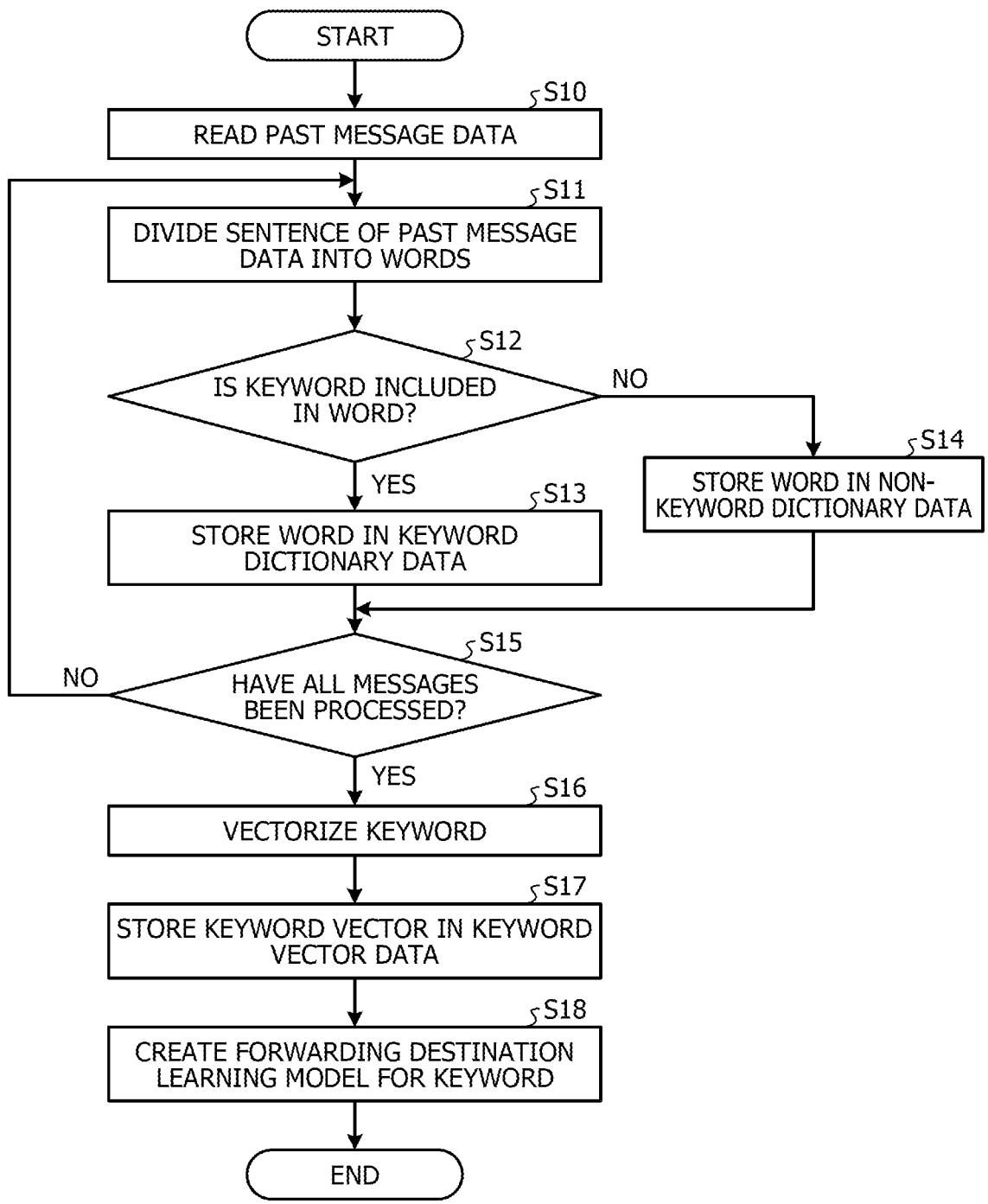

FIG. 11

```
{
  "first"_ message: [
    "message": "abc"
R1 → "similality": "1.00"
    "action": "MAKE INQUIRY TO DEPARTMENT A"
  ],
  "second"_ message: [
    "message": "def"
R2 → "similality": "0.55"
    "action": "MAKE INQUIRY TO DEPARTMENT B"
  ],
  "third"_ message: [
    "message": "ghi"
R3 → "similality": "0.27"
    "action": "MAKE INQUIRY TO DEPARTMENT C"
  ]
}
```

FIG. 13

```
{
  "msg_keywords": [
      "a",
K1 →  "b",
      "c"
  ],
  "exist_keywords": [
      "a",
K2 →  "b",
      "c'"
  ]
}
```

FIG. 14

```
{
  "probabilities": [
    {
      "probability": "0.85"
      "action": "MAKE INQUIRY TO DEPARTMENT A"
    },
    {
      "probability": "0.15"
      "action": "MAKE INQUIRY TO DEPARTMENT B"         ← R10
    }
  ],
  "top_keywords": [
    {
      "action": "MAKE INQUIRY TO DEPARTMENT A"
      "explain_keywords": [
        {
          "keywords": "a"
          "explanations": "0.3"    ← R11
        },
        {
          "keywords": "b"
          "explanations": "0.2"
        },
        {
          "keywords": "c"
          "explanations": "0.1"
        }
      ]
    },
    {
      "action": "MAKE INQUIRY TO DEPARTMENT B"
      "explain_keywords": [
        {
          "keywords": "a"
          "explanations": "0.03"
        },
        {
          "keywords": "b"
          "explanations": "0.02"
        },
        {
          "keywords": "c"
          "explanations": "0.01"
        }
      ]
    }
  ]
}
```

NON-TRANSITORY COMPUTER-READABLE RECORDING MEDIUM, ESTIMATION METHOD, AND INFORMATION PROCESSING DEVICE

CROSS-REFERENCE TO RELATED APPLICATION

This application is based upon and claims the benefit of priority of the prior Japanese Patent Application No. 2020-197099, filed on Nov. 27, 2020, the entire contents of which are incorporated herein by reference.

FIELD

The embodiment discussed herein is related to a non-transitory computer-readable recording medium, an estimation method, and an information processing device.

BACKGROUND

In a case where an error message is received from a system, a person in charge of operation of a system to be monitored forwards the error message to a department that handles the trouble. In recent years, since the number of systems has increased due to advances in cloud technology and the load on the person in charge of operation has increased due to the increase in the number of error messages and forwarding destinations, reducing the load on the person in charge of operation has been in demand.

There has been known a technique of performing learning/clustering based on anomalous cases and classifying and presenting new observation data as a conventional technique of supporting the work of forwarding error messages for reducing such load on the person in charge of operation.

Japanese Laid-open Patent Publication No. 2009-31810 and Japanese Laid-open Patent Publication No. 2013-41448 are disclosed as related art.

SUMMARY

According to an aspect of the embodiments, a non-transitory computer-readable recording medium storing an estimation program that causes a processor included in a computer to execute a process, the process includes: receiving a message of an estimation target of a forwarding destination; searching past messages for a message similar to the received message; estimating, when there is no similar message among the past massage, the forwarding destination of the message using a model of estimating the forwarding destination based on a keyword that is identified based on a word included in the received message; and outputting a forwarding destination of the searched similar message or the estimated forwarding destination.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2A is an explanatory diagram exemplifying data contents of a past message storage unit;

FIG. 2B is an explanatory diagram exemplifying data contents of a keyword dictionary storage unit and a non-keyword dictionary storage unit;

FIG. 2C is an explanatory diagram exemplifying data contents of a keyword vector storage unit;

FIG. 3 is a flowchart illustrating an exemplary operation of a learning phase;

FIG. 11 is an explanatory diagram illustrating exemplary output of a forwarding destination;

FIG. 13 is an explanatory diagram illustrating exemplary keyword data;

FIG. 14 is an explanatory diagram illustrating an exemplary output result.

DESCRIPTION OF EMBODIMENTS

The conventional technique described above has a problem that it is difficult to classify an unknown error message, which is not similar to the past cases, into an appropriate forwarding destination.

In one aspect, it aims to provide an estimation program, an estimation method, and an information processing device capable of classifying a message into an appropriate forwarding destination.

Hereinafter, an estimation program, an estimation method, and an information processing device according to an embodiment will be described with reference to the drawings. Configurations having the same functions in the embodiment are denoted by the same reference signs, and redundant description will be omitted. Note that the estimation program, the estimation method, and the information processing device described in the following embodiment are merely examples, and do not limit the embodiment. Furthermore, each of the embodiments below may be appropriately combined unless otherwise contradicted.

Figure 1:
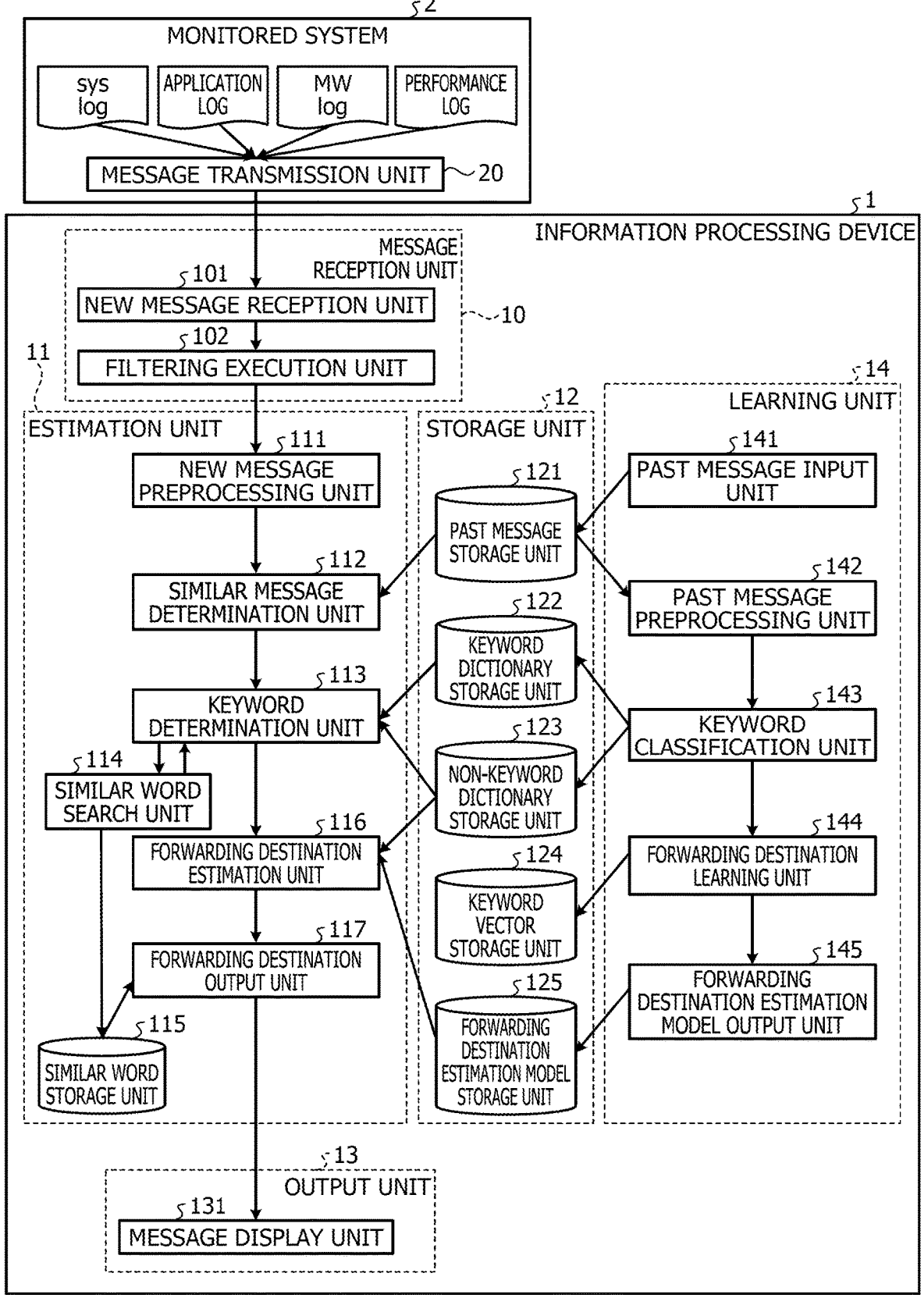
FIG. 1 is a block diagram illustrating an exemplary functional configuration of an information processing device according to an embodiment.

FIG. 1 is a block diagram illustrating an exemplary functional configuration of the information processing device according to the embodiment. As illustrated in FIG. 1, an information processing device 1 is a device that displays and outputs, on a display or the like, a forwarding destination of an error message (hereinafter, also referred to as a new message) received from a monitored system 2 to present it to a person in charge of operation (user). In this manner, the information processing device 1 supports the work of the user who forwards the error message to a department that handles a trouble of the monitored system 2.

For example, a personal computer (PC) or the like may be applied as the information processing device 1.

Specifically, for example, the information processing device 1 includes a message reception unit 10, an estimation unit 11, a storage unit 12, an output unit 13, and a learning unit 14.

The message reception unit 10 is a processing unit that receives new messages collected and distributed by a message transmission unit 20 of the monitored system 2 from a Syslog, application log, MWlog, performance log, and the like. Specifically, for example, the message reception unit 10 includes a new message reception unit 101 and a filtering execution unit 102.

The new message reception unit 101 receives new messages distributed by the monitored system 2 via a network such as a local area network (LAN). The new message reception unit 101 outputs the received new messages to the filtering execution unit 102.

The filtering execution unit 102 is a processing unit that executes filtering of the new messages received by the new message reception unit 101 on the basis of a preset rule. For example, the filtering execution unit 102 excludes a new message from the forwarding target in a case where a flag indicating a level of importance included in the new message, a character string included in the message contents, or the like does not satisfy predetermined conditions. As an example, the filtering execution unit 102 excludes a new message with a level of importance less than a threshold value or not including a character string such as "urgent" from the forwarding target as a message related to an error that does not need to be dealt with.

The estimation unit 11 is a processing unit that estimates a forwarding destination of the new message to be forwarded received by the message reception unit 10. Specifically, for example, the estimation unit 11 includes a new message preprocessing unit 111, a similar message determination unit 112, a keyword determination unit 113, a similar word search unit 114, a similar word storage unit 115, a forwarding destination estimation unit 116, and a forwarding destination output unit 117.

The new message preprocessing unit 111 is a processing unit that preprocesses a new message to be forwarded. Specifically, for example, the new message preprocessing unit 111 applies, to a new message, a regular expression or the like representing a target to be matched, thereby extracting a predetermined character string. For example, the new message preprocessing unit 111 divides a new message into respective words included in a message title, body, and the like. Then, the new message preprocessing unit 111 vectorizes the new message on the basis of the divided words using a publicly known vectorization method such as the term frequency-inverse document frequency (tf-idf).

The similar message determination unit 112 is a processing unit that compares the new message preprocessed by the new message preprocessing unit 111 with respective past messages stored in the past message storage unit 121 that stores past message data to make a determination of a similar message. Specifically, for example, the similar message determination unit 112 compares the new message vectorized using tf-idf or the like with the past message to obtain cosine similarity. Then, when the obtained cosine similarity is equal to or higher than a predetermined threshold value, the similar message determination unit 112 determines that the new message and the past message are similar.

The keyword determination unit 113 is a processing unit that determines whether or not each word included in a new message is a specific keyword. Specifically, for example, the keyword determination unit 113 refers to a keyword dictionary storage unit 122 that stores a keyword dictionary in which a plurality of keywords is present, and when each word included in the new message is included in the keyword dictionary, identifies the word as a keyword.

Furthermore, when each word included in the new message is not included in the keyword dictionary, the keyword determination unit 113 refers to a non-keyword dictionary storage unit 123 that stores a non-keyword dictionary in which a plurality of non-keywords not identified as a keyword is present, and determines whether or not each word is included in the non-keyword dictionary. Here, it is assumed that the keyword determination unit 113 does not use a word included in the non-keyword dictionary as a keyword.

For a word not included in the non-keyword dictionary, the keyword determination unit 113 performs searching to find out whether or not a similar word similar to the word is included in the keyword dictionary using the similar word search unit 114. Here, in a case where a similar word similar to the word is included in the keyword dictionary, the keyword determination unit 113 identifies the similar word included in the keyword dictionary, which has been found through the searching, as a keyword.

The similar word search unit 114 is a processing unit that searches the keyword dictionary stored in the similar message determination unit 112 for a similar word similar to the word instructed to be searched for by the keyword determination unit 113. Specifically, for example, the similar word search unit 114 vectorizes meanings of words, and by the vectorization, it searches for a similar word similar to the word according to calculation of closeness of meanings between words or using a publicly known method, such as Word2vec, which makes it possible to evaluate a combination of multiple words by adding or subtracting the words themselves. The similar word search unit 114 returns the similar word obtained through the search to the keyword determination unit 113, and stores it in the similar word storage unit 115. The similar word storage unit 115 is a memory that stores similar words obtained through the search performed by the similar word search unit 114.

The forwarding destination estimation unit 116 is a processing unit that estimates a forwarding destination using a forwarding destination estimation model that estimates a forwarding destination stored in the forwarding destination estimation model storage unit 125 on the basis of the keyword identified by the similar word storage unit 115 based on the word included in the new message. The forwarding destination estimation model (also called a learning model) is a model generated by the learning unit 14 based on machine learning using past messages as teaching data in such manner that an estimation result of a forwarding destination is output by inputting information associated with a keyword included in a message. The forwarding destination estimation unit 116 inputs, to the forwarding destination estimation model, information associated with the keyword identified by the similar word storage unit 115, thereby obtaining an estimation result of the forwarding destination.

The forwarding destination output unit 117 is a processing unit that outputs the estimation result of the forwarding destination estimated by the estimation unit 11. Specifically, for example, when there is a message similar to the new message in the past messages stored in the past message storage unit 121, the forwarding destination output unit 117 reads the forwarding destination of the similar past message from the past message storage unit 121, and outputs it. Furthermore, when there is no message similar to the new message in the past messages, the forwarding destination output unit 117 outputs a forwarding destination estimated by the forwarding destination estimation unit 116 from the new message.

The storage unit 12 is a storage device, such as a memory, which stores various kinds of information. Specifically, for example, the storage unit 12 includes the past message storage unit 121, the keyword dictionary storage unit 122, the non-keyword dictionary storage unit 123, a keyword vector storage unit 124, and the forwarding destination estimation model storage unit 125.

The past message storage unit 121 stores respective cases (error messages) that have occurred in the past in the monitored system 2 as past messages with forwarding destinations.

FIG. 2A is an explanatory diagram exemplifying data contents of the past message storage unit 121. As illustrated in FIG. 2A, the past message storage unit 121 stores data of message, recommend, label, key1, key2, key3, and so on, for each of past messages. Here, the item "message" is message contents (body). The item "recommend" is contents of a forwarding destination. The item "label" is a label of contents of a forwarding destination. The items "key1", "key2", "key3", and so on are lists of keywords included in the message contents.

The keyword dictionary storage unit 122 stores a keyword dictionary indicating a plurality of keywords registered in advance. The non-keyword dictionary storage unit 123 stores a non-keyword dictionary indicating a plurality of non-keywords registered in advance.

FIG. 2B is an explanatory diagram exemplifying data contents of the keyword dictionary storage unit 122 and the non-keyword dictionary storage unit 123. As illustrated in FIG. 2B, the keyword dictionary storage unit 122 stores each keyword. The non-keyword dictionary storage unit 123 stores each non-keyword (notkeyword).

At the time of machine learning using past messages as teaching data, the non-keyword dictionary storage unit 123 stores keyword vectors obtained by vectorizing respective past messages.

FIG. 2C is an explanatory diagram exemplifying data contents of the keyword vector storage unit 124. As illustrated in FIG. 2C, the keyword vector storage unit 124 stores data obtained by dividing past messages ("abc", "def", etc.) into respective words ("a", "b", etc.) and vectorizing them.

The forwarding destination estimation model storage unit 125 stores data such as parameters related to the forwarding destination estimation model generated by the learning unit 14.

The output unit 13 is a processing unit that outputs, to the user, information associated with the forwarding destination of the new message estimated by the estimation unit 11. Specifically, for example, the output unit 13 includes a message display unit 131. The message display unit 131 displays, on a display, the estimation result of the forwarding destination output by the forwarding destination output unit 117.

The learning unit 14 is a processing unit that generates (learns) a forwarding destination estimation model on the basis of machine learning using past messages as teaching data. Specifically, for example, the learning unit 14 includes a past message input unit 141, a past message preprocessing unit 142, a keyword classification unit 143, a forwarding destination learning unit 144, and a forwarding destination estimation model output unit 145.

The past message input unit 141 is a processing unit that receives cases (error messages) that have occurred in the past in the monitored system 2 with forwarding destinations by input from the user. The past message input unit 141 stores data of the received past messages in the past message storage unit 121.

The past message preprocessing unit 142 is a processing unit that reads the past messages stored in the past message storage unit 121 as teaching data for supervised machine learning, and performs preprocessing. Specifically, for example, in a similar manner to the new message preprocessing unit 111, a past message is divided into respective words included in a message title, body, and the like.

The keyword classification unit 143 is a processing unit that classifies words included in a past message into keywords and non-keywords with respect to the past messages preprocessed by the past message preprocessing unit 142.

For example, the keyword classification unit 143 presents, on a display or the like, each word divided from the past message to the user, and receives a keyword or non-keyword selection instruction for each word. In response to this selection instruction, the keyword classification unit 143 classifies the words included in the past message into keywords and non-keywords. Furthermore, the keyword classification unit 143 may refer to the word itself as a keyword (or non-keyword) or keyword setting data in which conditions for the word as a keyword (or non-keyword) are set in advance to classify the words included in the past message into keywords and non-keywords.

The keyword classification unit 143 stores the classified keywords and non-keywords in the keyword dictionary storage unit 122 and the non-keyword dictionary storage unit 123. As a result, the keyword classification unit 143 creates a keyword dictionary and a non-keyword dictionary from past messages.

The forwarding destination learning unit 144 is a processing unit that performs machine learning of a forwarding destination estimation model in such a manner that forwarding destinations of the keywords are calculated from the keywords classified from the past messages, with the forwarding destinations assigned to the past messages as correct answers.

Specifically, for example, the forwarding destination learning unit 144 vectorizes the keywords classified from the past messages, and stores them in the keyword vector storage unit 124. Then, the forwarding destination learning unit 144 learns parameters of each layer of the forwarding destination estimation model in such a manner that the label indicating the forwarding destination assigned to the past message is output from the output layer when a keyword vector is input to the input layer of the forwarding destination estimation model.

The forwarding destination estimation model output unit 145 is a processing unit that stores the forwarding destination estimation model machine-learned by the forwarding destination learning unit 144 in the forwarding destination estimation model storage unit 125. Specifically, for example, the forwarding destination estimation model output unit 145 stores, in the forwarding destination estimation model storage unit 125, the parameters of each layer in the forwarding destination estimation model obtained by machine learning.

Here, operation of the learning phase related to machine learning by the learning unit 14 will be described. FIG. 3 is a flowchart illustrating an exemplary operation of the learning phase.

As illustrated in FIG. 3, when the process starts, the past message preprocessing unit 142 reads data of a past message stored in the past message storage unit 121 (S10). Next, the past message preprocessing unit 142 divides the sentence of the read data of the past message into words (S11).

Next, the keyword classification unit 143 determines, for each divided word, whether or not a keyword in the keyword setting data is included (S12). When a keyword is included (Yes in S12), the keyword classification unit 143 stores the word in the keyword dictionary (S13). When the keyword is not included (No in S12), the keyword classification unit 143 stores the word in the non-keyword dictionary (S14).

Figure 4:
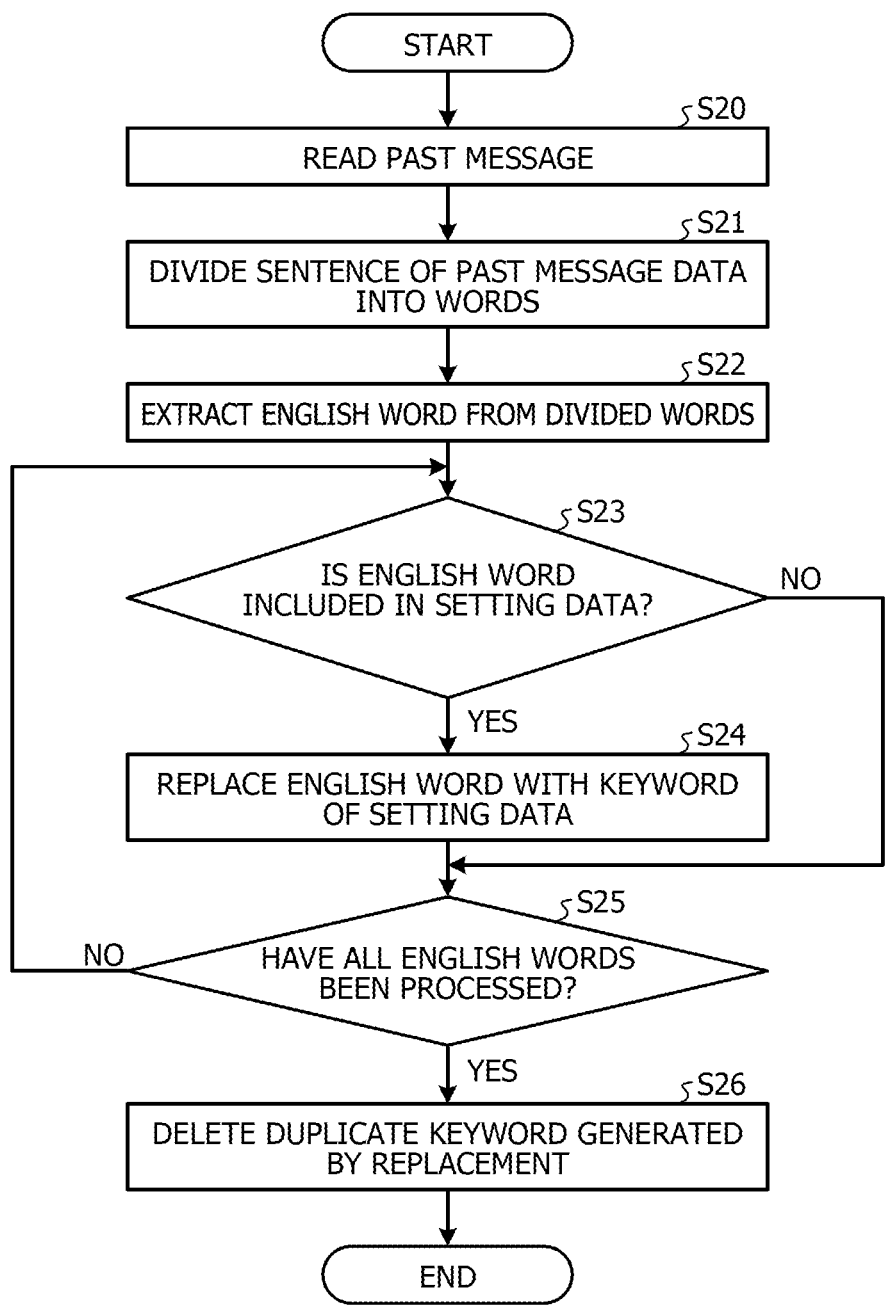
FIG. 4 is a flowchart illustrating an exemplary word combination process in the learning phase.
Figure 5:
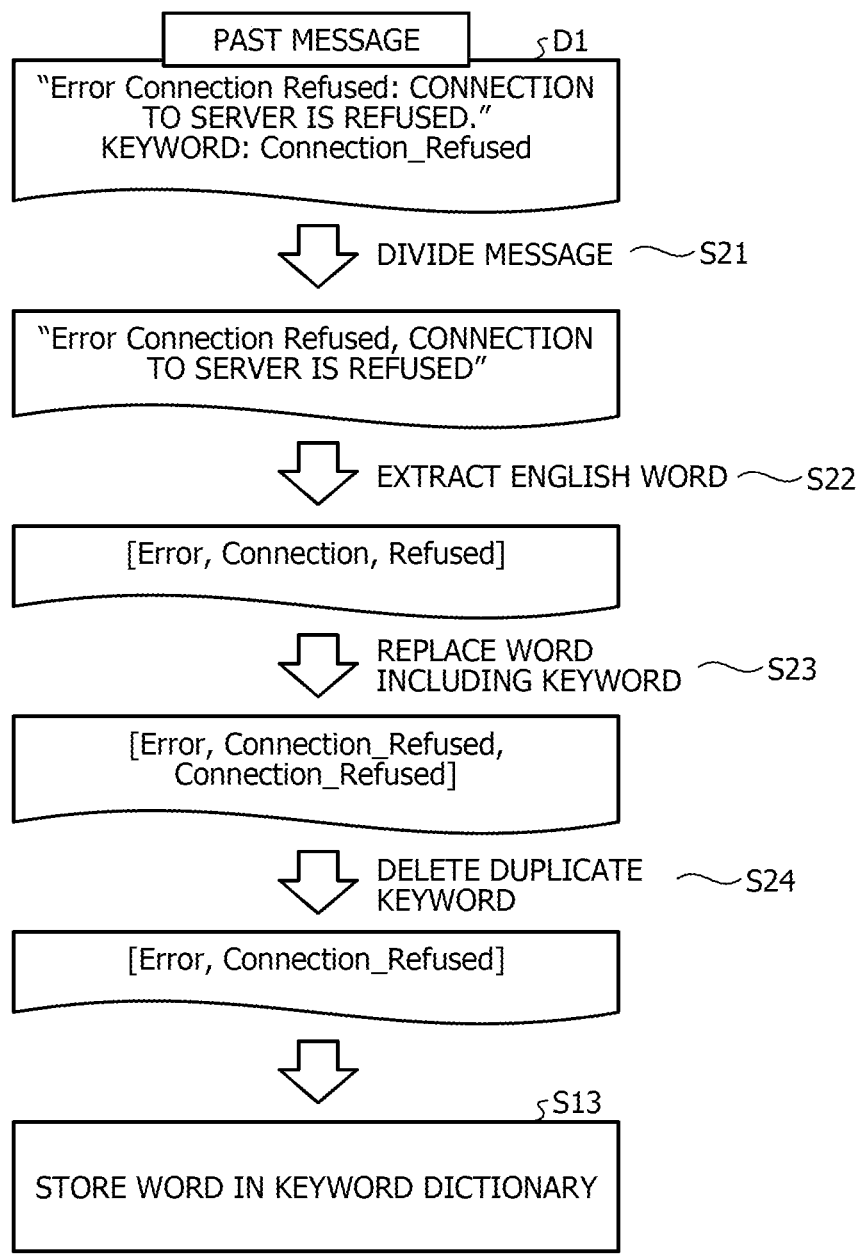
FIG. 5 is an explanatory diagram illustrating an outline of the word combination process in the learning phase.

Note that, in the case of storing words in the keyword dictionary, the keyword classification unit 143 may store the words after integrating them through a word combination process. FIG. 4 is a flowchart illustrating an exemplary word combination process in the learning phase. FIG. 5 is an explanatory diagram illustrating an outline of the word combination process in the learning phase.

As illustrated in FIGS. 4 and 5, when the process starts, the past message preprocessing unit 142 reads data of a past message stored in the past message storage unit 121 (S20). Next, the past message preprocessing unit 142 divides the sentence of the read data of the past message into words (S21).

Next, the keyword classification unit 143 extracts English words from the divided words (S22). Next, the keyword classification unit 143 determines whether or not the extracted English words are included in the keywords in the keyword setting data (S23). When the extracted English words are included in the keyword setting data (Yes in S23), the keyword classification unit 143 replaces the English words with the keywords of the keyword setting data (S24). When the extracted English words are not included in the keyword setting data (No in S23), the keyword classification unit 143 skips the processing of S24, and proceeds to the processing of S25.

Next, the keyword classification unit 143 determines whether or not all the English words have been processed (S25), and returns the process to S23 if there is an unprocessed English word (No in S25).

If all the English words have been processed (Yes in S25), the keyword classification unit 143 deletes duplicate keywords generated as a result of the replacement (S26), and terminates the process. As a result, in the example of FIG. 5, a keyword [Error, Connection_Refused] is stored in the keyword dictionary from a past message D1 (S13).

Since there is no regularity in an input document in general document classification based on machine learning, it is difficult to grasp characteristics of the document unless the document is separated into word units by morphological analysis. However, in error messages, there may be a case where recognition of long character strings is effective by using types (relevance between the character string and the message becomes higher as the length of the recognizable character string becomes longer, which makes it easier to be recognized).

At the time of vectorizing keywords, the keywords have been divided based on a specified rule such as a regular expression, and thus the words included in the keyword dictionary created from the past message D1 have also been divided on the basis of the rule. For example, when a keyword in the message is English, the keyword is to be divided in word units separated by half-width spaces.

Here, since an error message has a tendency of having a certain type, the longer a keyword is, the easier it is to recognize the message from the keyword. Therefore, when the keyword for the English message is a short keyword on a word-by-word basis, there may arise a problem that the relevance to the original message is lowered and the accuracy is lowered.

For example, in a case where a keyword is "Connection Refused", the keyword is divided into "Connection" and "Refused" after being vectorized, thereby lowering the relevance between the keyword and the message.

However, in the information processing device 1, the keyword to be stored in the keyword dictionary remains to be "Connection_Refused" by the word combination process described above performed.

Returning to FIG. 3, the learning unit 14 determines whether or not all the past messages D1 read from the past message storage unit 121 have been processed (S15). When there is an unprocessed past message D1 (No in S15), the learning unit 14 returns the process to S11.

When all the past messages D1 have been processed (Yes in S15), the forwarding destination learning unit 144 vectorizes the keywords of the past messages D1 (S16), and stores the keyword vectors of the past messages D1 in the keyword vector storage unit 124 (S17). Next, the forwarding destination learning unit 144 creates a learning model of the forwarding destination for the keyword (S18), and terminates the process.

Figure 6:
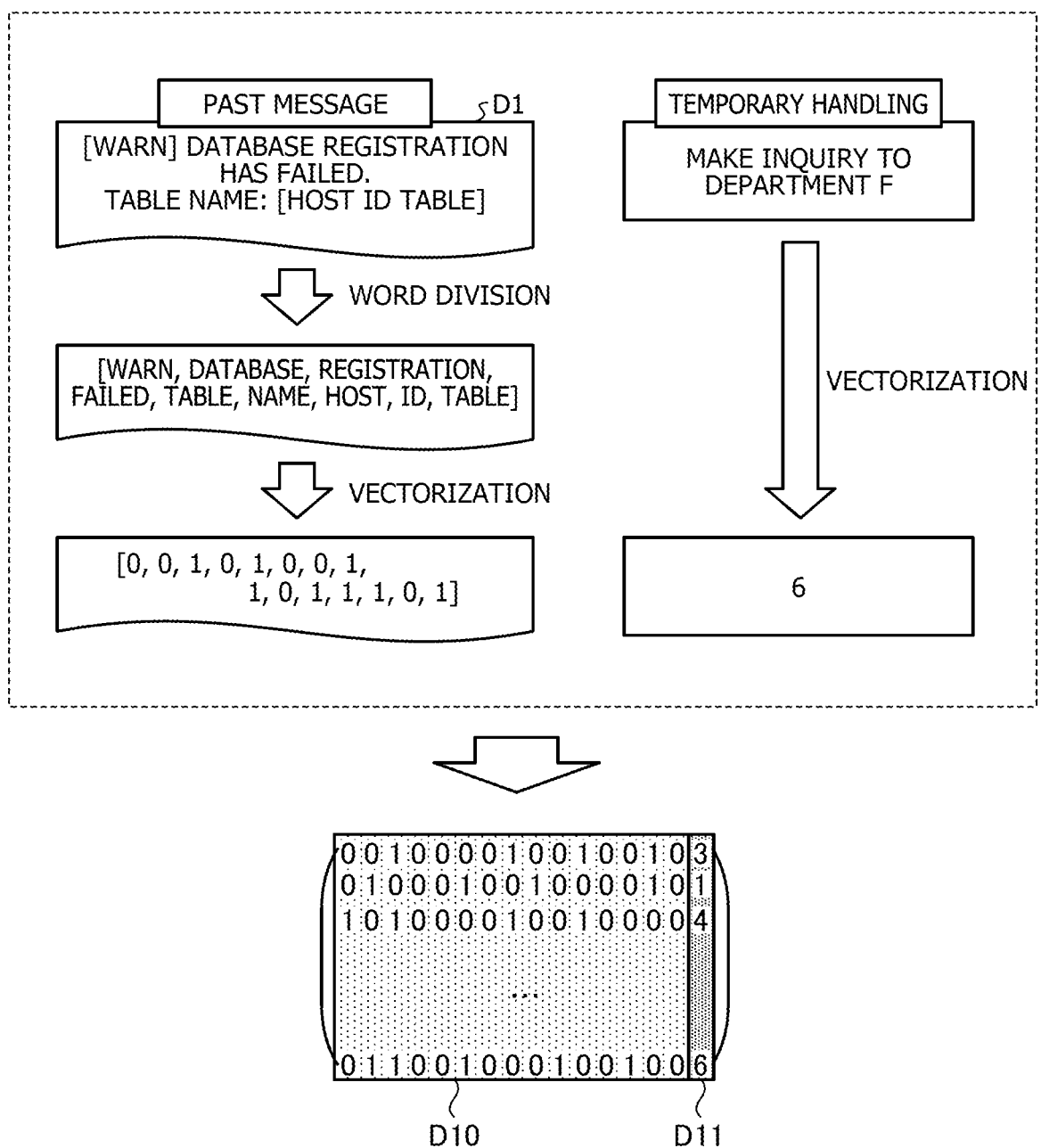
FIG. 6 is an explanatory diagram illustrating exemplary data of learning model generation.

FIG. 6 is an explanatory diagram illustrating exemplary data of learning model generation. As illustrated in FIG. 6, in generation of a learning model, a keyword vector D10 obtained by vectorizing the keyword identified by word division and a label D11 obtained by vectorizing the forwarding destination assigned to the past message D1 are prepared from the past message D1. The forwarding destination learning unit 144 generates (learns) a learning model in such a manner that, in a case where the keyword vector D10 is input to the input layer of the learning model, the label D11 is output from the output layer.

Figure 7:
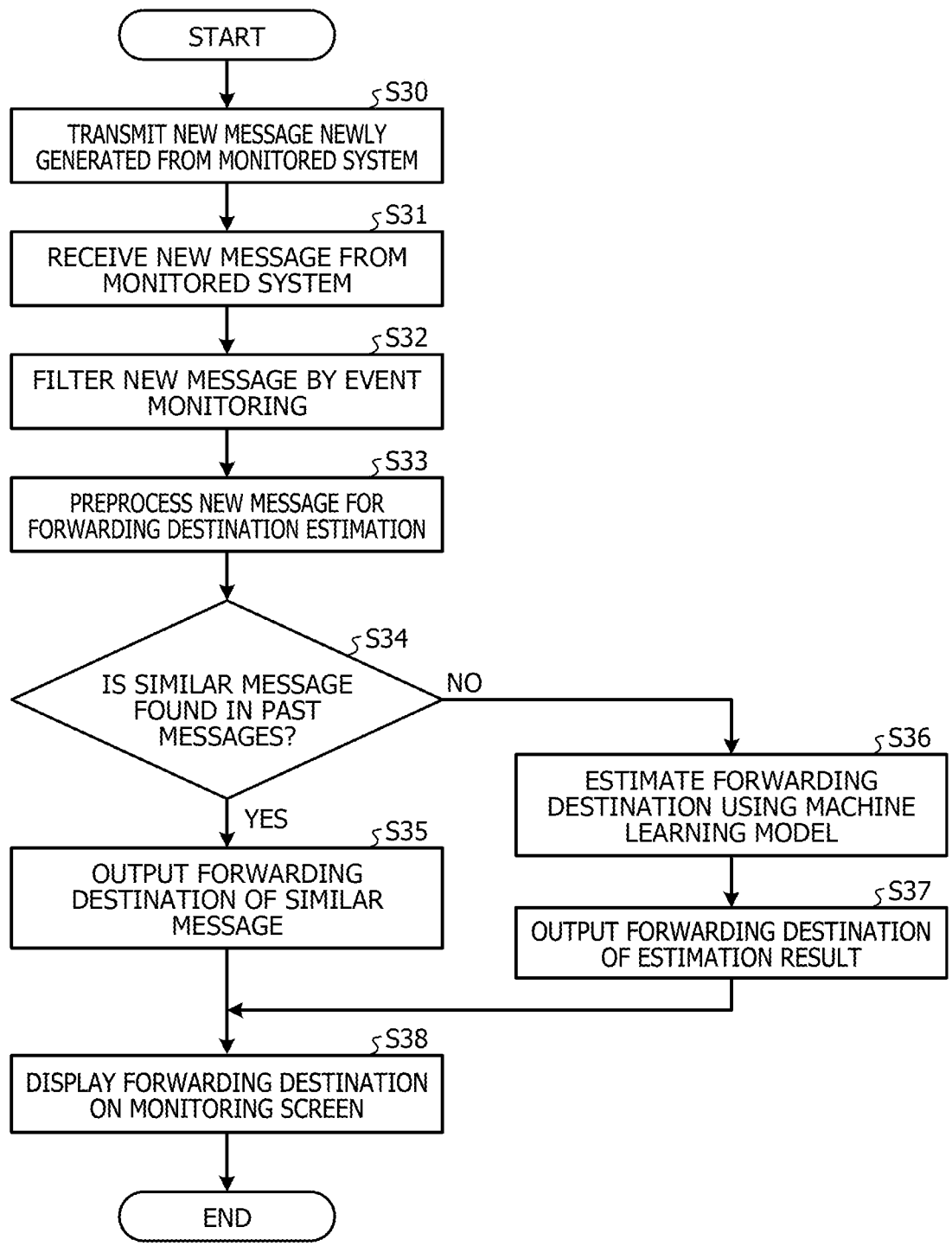
FIG. 7 is a flowchart illustrating an exemplary operation of the information processing device according to the embodiment.

FIG. 7 is a flowchart illustrating an exemplary operation of the information processing device 1 according to the embodiment. As illustrated in FIG. 7, the message transmission unit 20 transmits a new message (error message) newly generated from the monitored system 2 (S30).

Next, the new message reception unit 101 receives the new message from the monitored system 2 (S31). Next, the filtering execution unit 102 filters the received new message by event monitoring performed at a predetermined timing (e.g., at intervals of several seconds) (S32).

Next, the new message preprocessing unit 111 performs preprocessing (e.g., word division etc.) on the new message for estimating a forwarding destination (S33). Next, the similar message determination unit 112 determines whether or not a message similar to the new message is found in the past messages of the past message storage unit 121 (S34).

When a similar message is found (Yes in S34), the forwarding destination output unit 117 reads the forwarding destination of the similar message from the past message storage unit 121, and outputs it (S35).

When no similar message is found (No in S34), the keyword determination unit 113 identifies a keyword from the new message. Next, the forwarding destination estimation unit 116 estimates a forwarding destination using a machine learning model (forwarding destination estimation model) based on the identified keyword (S36). Next, the forwarding destination output unit 117 outputs the forwarding destination of the estimation result of the forwarding destination estimation unit 116 (S37).

Next, the message display unit 131 displays the forwarding destination output in S35 or S37 on the monitoring screen of the display (S38), and terminates the process.

Figure 8:
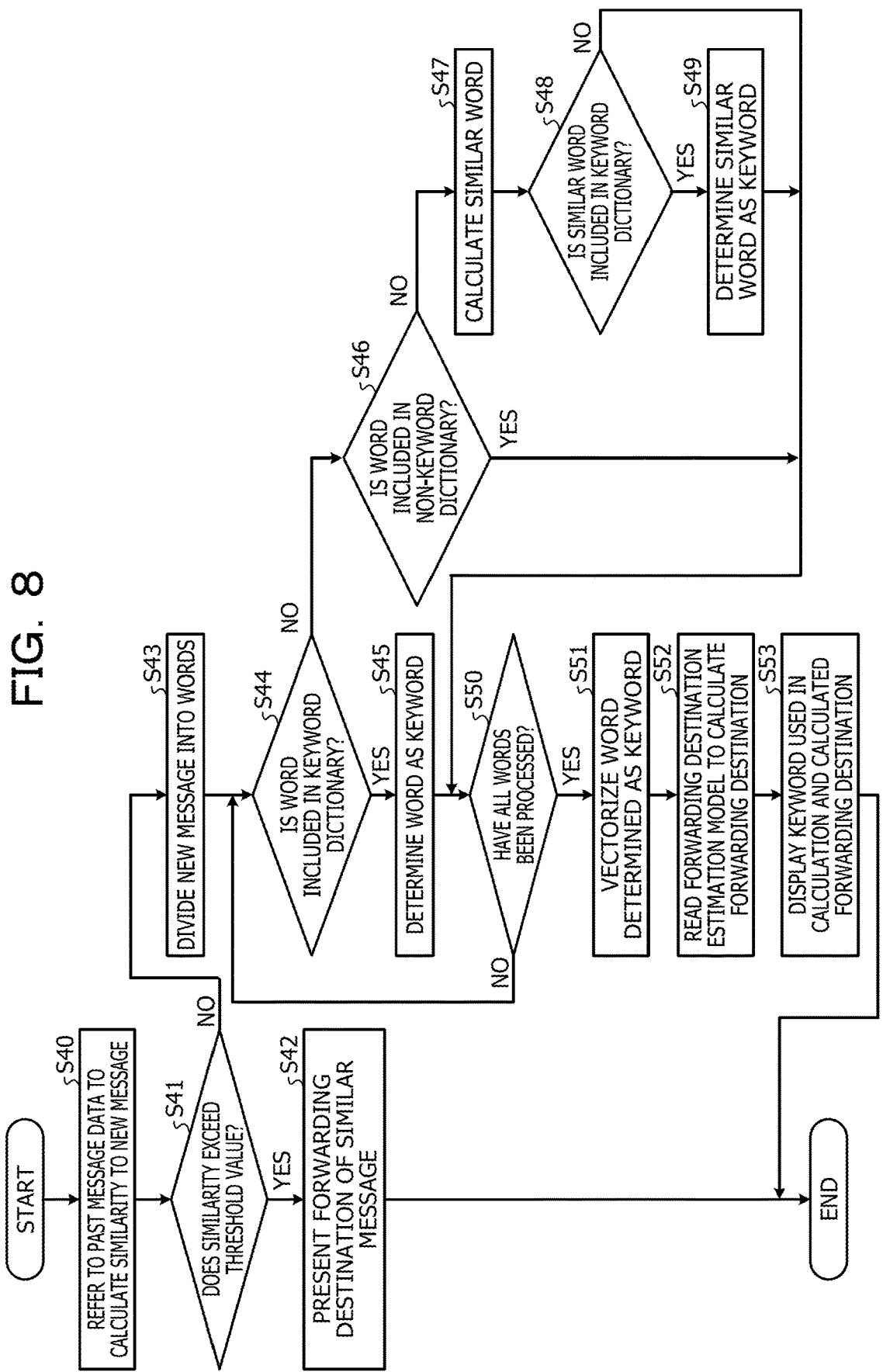
FIG. 8 is a flowchart illustrating an exemplary operation of an estimation phase.

Here, an estimation phase related to the estimation of the forwarding destination of the new message will be described. FIG. 8 is a flowchart illustrating an exemplary operation of the estimation phase.

As illustrated in FIG. 8, when the process starts, the similar message determination unit 112 refers to past message data of the past message storage unit 121 to calculate similarity (e.g., cosine similarity) to the new message (S40).

Next, the similar message determination unit 112 determines whether or not the calculated similarity exceeds a threshold value (S41). When the similarity exceeds the threshold value (Yes in S41), the message display unit 131 displays the forwarding destination of the similar message to present it to the user (S42).

When the calculated similarity does not exceed the threshold value (No in S41), the new message preprocessing unit 111 divides the new message into words (S43). Next, the keyword determination unit 113 determines whether or not a divided word is included in the keyword dictionary of the keyword dictionary storage unit 122 (S44).

When it is included in the keyword dictionary (Yes in S44), the keyword determination unit 113 determines that the divided word is a keyword (S45). When it is not included in the keyword dictionary (No in S44), the keyword determination unit 113 determines whether or not the divided word is included in the non-keyword dictionary of the non-keyword dictionary storage unit 123 (S46).

when it is included in the non-keyword dictionary (Yes in S46), the keyword determination unit 113 proceeds to the processing of S50 without using the divided word as a keyword.

When it is not included in the non-keyword dictionary (No in S46), the similar word search unit 114 calculates a similar word of the divided word (S47), and determines whether or not the calculated similar word is included in the keyword dictionary (S48).

When the similar word is included in the keyword dictionary (Yes in S48), the keyword determination unit 113 determines that the similar word is a keyword (S49). When the similar word is not included in the keyword dictionary (No in S48), the keyword determination unit 113 proceeds to the processing of S50 without using the similar word as a keyword.

Next, the keyword determination unit 113 determines whether or not all the divided words have been processed (S50), and returns the process to S44 when there is an unprocessed word (No in S50).

When all the words have been processed (Yes in S50), the forwarding destination estimation unit 116 vectorizes the word determined to be a keyword (S51). Next, the forwarding destination estimation unit 116 reads the forwarding destination estimation model from the forwarding destination estimation model storage unit 125, and inputs the vectorized keyword vector to the model, thereby calculating a forwarding destination (S52).

Next, the message display unit 131 receives the calculation result of the forwarding destination estimation unit 116 from the forwarding destination output unit 117, and displays, on the display, the keyword used in the calculation and the calculated forwarding destination (S53).

Figure 9:
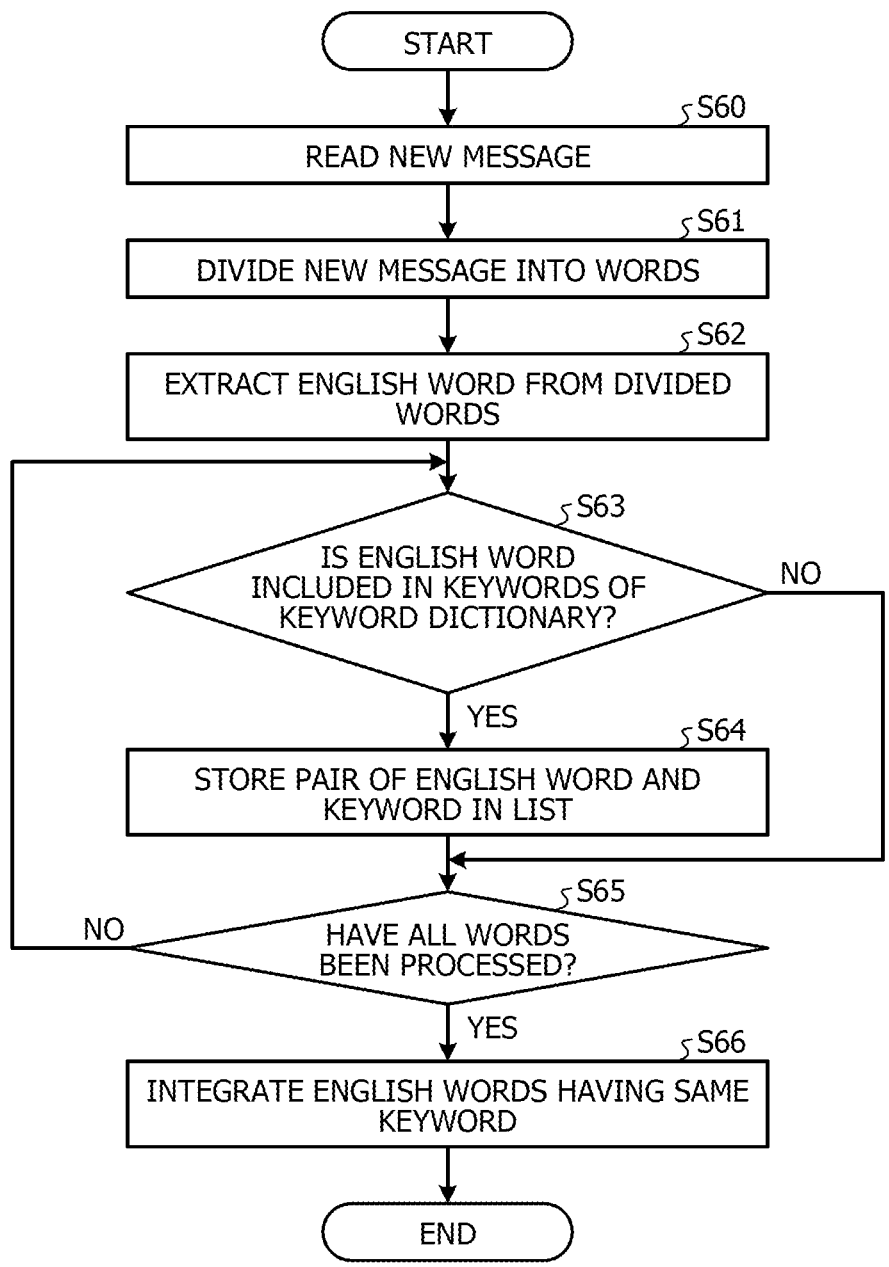
FIG. 9 is a flowchart illustrating an exemplary word combination process in the estimation phase.
Figure 10:
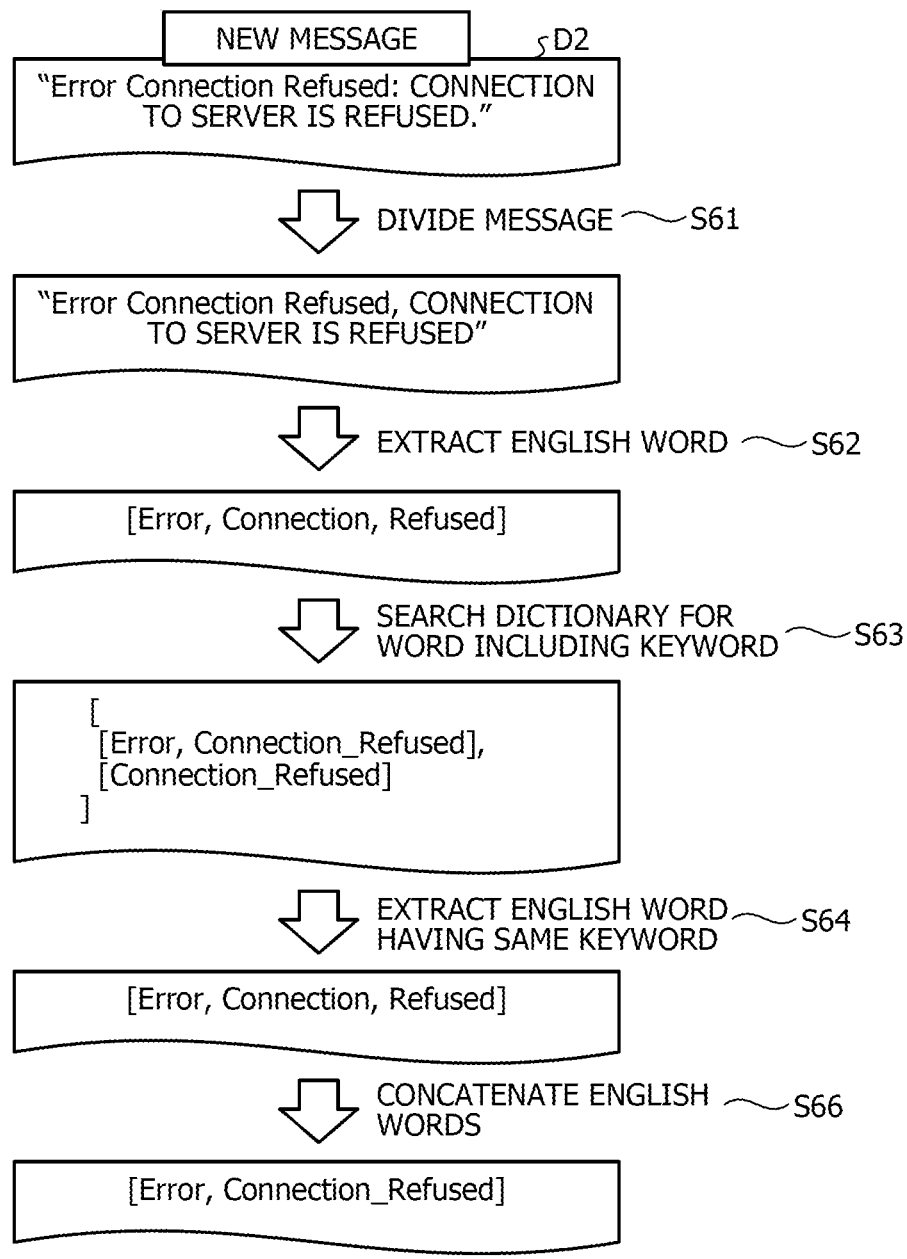
FIG. 10 is an explanatory diagram illustrating an outline of the word combination process in the estimation phase.

Note that the estimation unit 11 may perform the word combination process in a similar manner to the machine learning of the learning unit 14. FIG. 9 is a flowchart illustrating an example of the word combination process in the estimation phase. FIG. 10 is an explanatory diagram illustrating an outline of the word combination process in the estimation phase.

As illustrated in FIGS. 9 and 10, when the process starts, the new message preprocessing unit 111 reads a new message D2 (S60). Next, the new message preprocessing unit 111 divides the read new message D2 into words (S61).

Next, the keyword determination unit 113 extracts English words from the divided words (S62), and determines whether or not the extracted English words are included in the keywords of the keyword dictionary (S63).

When an extracted English word is included in the keywords of the keyword dictionary (Yes in S63), the keyword determination unit 113 stores the pair of the English word and keyword in a keyword candidate list (S64). When the extracted English word is not included in the keywords of the keyword dictionary (No in S63), the keyword determination unit 113 proceeds to the processing of S65 without storing the English word in the candidate list.

Next, the keyword determination unit 113 determines whether or not all the English words have been processed (S65), and returns the process to S63 when there is an unprocessed English word (No in S65).

When all the English words have been processed (Yes in S65), the keyword determination unit 113 integrates (concatenates) English words having the same keyword included in the candidate list (S66), and terminates the process. As a result, in the example of FIG. 10, a keyword [Error, Connection_Refused] is identified from the new message D2.

For example, when a word included in the new message D2 is "Connection Refused", the keyword is divided into "Connection" and "Refused" after being vectorized as it is, thereby lowering the relevance between the keyword and the message.

However, in the information processing device 1, the keyword to be identified from the new message D2 remains to be "Connection_Refused" by the word combination process described above performed. Therefore, in the information processing device 1, the relevance between the character string and the message becomes higher as the length of the recognizable character string (keyword) becomes longer, and the effect of increasing estimation accuracy of the forwarding destination may be expected.

Figure 12:
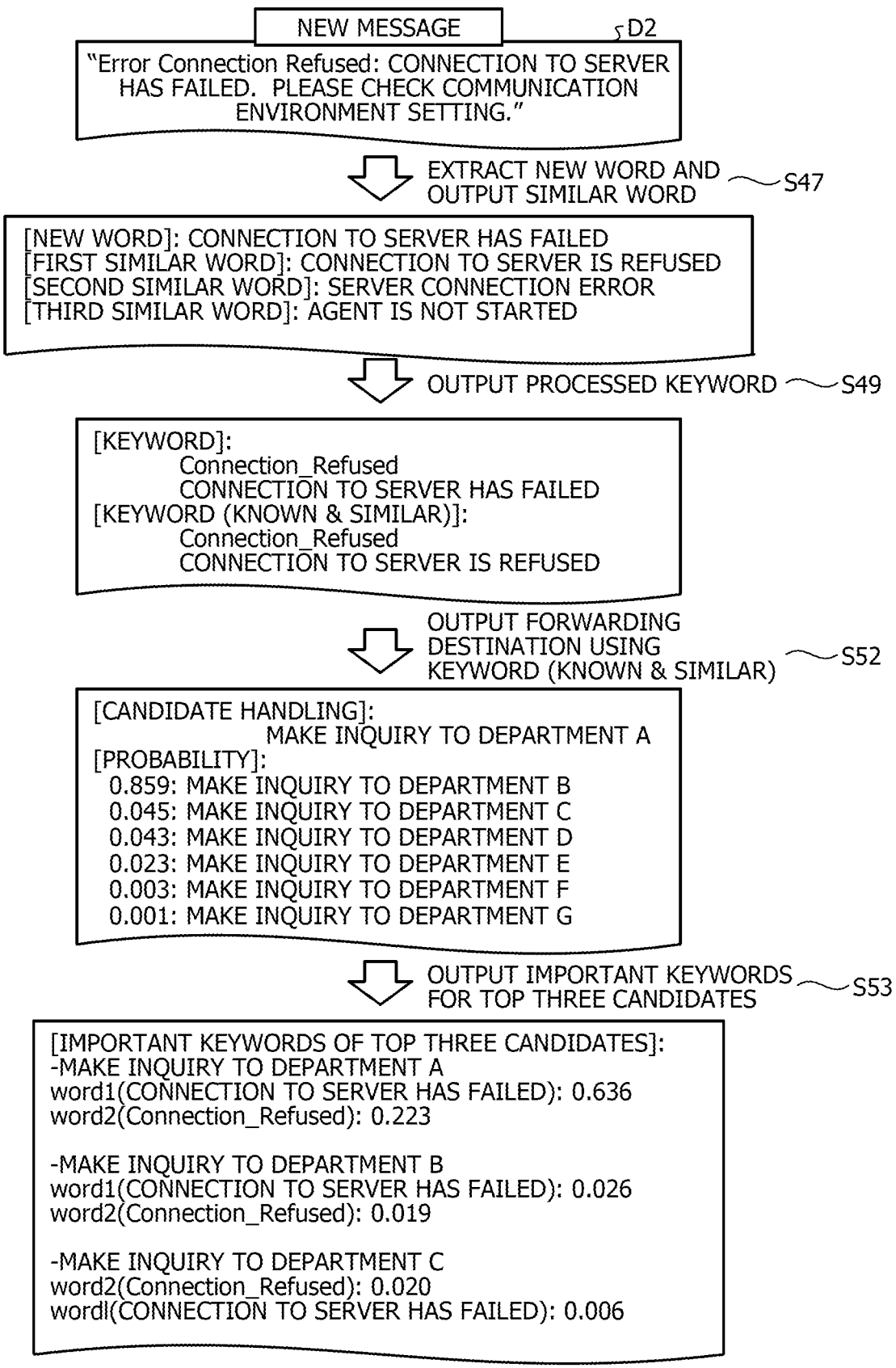
FIG. 12 is an explanatory diagram illustrating exemplary output of the forwarding destination.

Here, an example of the output (display) of the forwarding destination in S42 and S53 will be specifically described. FIGS. 11 and 12 are explanatory diagrams illustrating exemplary output of the forwarding destination. Specifically, for example, FIG. 11 is a diagram illustrating an example of the output (display) of the forwarding destination in S42. FIG. 12 is a diagram illustrating an example of the output (display) of the forwarding destination in S53.

As illustrated in FIG. 11, in S42, forwarding destination results R1 to R3 indicating forwarding destinations of similar messages similar to the new message are output in order of similarity. Here, in the forwarding destination results R1 to R3, an item "message" indicates contents of a similar message. An item "similarity" indicates similarity to the new message. An item "action" indicates a forwarding destination. By checking the contents of the forwarding destination results R1 to R3, the user is enabled to classify the forwarding destination of the new message.

As illustrated in FIG. 12, when there is no similar message similar to the new message D2, the keyword is identified, the forwarding destination is estimated using the forwarding destination estimation model, and the estimation result is displayed. Here, the keyword determination unit 113 obtains a similar word for a new word in the case where there is no keyword matching the word of the new message D2 in the keyword dictionary (S47). Then, when a similar word is included in the keyword dictionary, the keyword determination unit 113 uses the similar word as a keyword.

Figure 13:
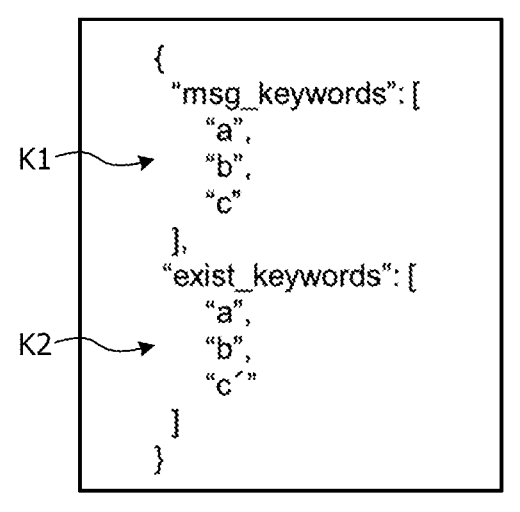

FIG. 13 is an explanatory diagram illustrating exemplary keyword data. Keyword data K1 of FIG. 13 indicates words in the new message D2. Keyword data K2 indicates words identified as keywords from the new message D2.

The forwarding destination estimation unit 116 vectorizes the keyword data K2, and inputs it to the forwarding destination estimation model, thereby obtaining a forwarding destination (S52). The forwarding destination output unit 117 outputs, for example, the top three candidates of the obtained forwarding destinations together with the keywords used in the estimation of the forwarding destination. As a result, the message display unit 131 displays, on the display, the top three candidates of the forwarding destinations together with the keywords (S53).

FIG. 14 is an explanatory diagram illustrating an example of the output result. Note that FIG. 14 exemplifies the output results of the top two candidates for the forwarding destination. As illustrated in FIG. 14, a forwarding destination result R10 includes a forwarding destination indicated by "action" and a score (probability) calculated by the forwarding destination estimation model. As a result, the user is enabled to check the forwarding destination of the new message D2 and its score.

The output result includes the forwarding destination result R10 used for the estimation of the forwarding destination. Specifically, for example, the forwarding destination result R10 includes a score (explanations) for each keyword. As a result, the user is enabled to easily check the keyword used at the time of estimating the forwarding destination of the new message D2.

As described above, the information processing device 1 receives the new message D2 of the estimation target of the forwarding destination from the monitored system 2. The information processing device 1 searches the past messages of the past message storage unit 121 for a message similar to the received new message D2. When there is no similar message in the past message storage unit 121, the information processing device 1 estimates a forwarding destination of the new message D2 using a model for estimating the forwarding destination stored in the forwarding destination estimation model storage unit 125 based on the keyword identified based on the word included in the received new message D2. The information processing device 1 outputs the forwarding destination or the estimated forwarding destination of the searched similar message.

As a result, in a case where the new message D2 is an unknown message without a similar message in the past message storage unit 121, the information processing device 1 is capable of classifying the message into the forwarding destination estimated using the keyword identified from the words included in the message. Therefore, according to the information processing device 1, it is also possible to classify an unknown message into an appropriate forwarding destination.

Furthermore, when a word included in the new message D2 is included in the keyword dictionary stored in the keyword dictionary storage unit 122, the information processing device 1 identifies the word as a keyword. As a result, according to the information processing device 1, it is possible to identify, among words included in the new message D2, a word included in the keyword dictionary stored in the keyword dictionary storage unit 122 as a keyword to be used in the model of estimating a forwarding destination. Therefore, according to the information processing device 1, it is possible to estimate, even for an unknown message without a similar message in the past message storage unit 121, a forwarding destination using a known keyword included in the message.

Furthermore, when a word included in the new message D2 is not included in the keyword dictionary stored in the keyword dictionary storage unit 122, the information processing device 1 identifies a similar word as a keyword if the similar word similar to the word is included in the keyword dictionary. As a result, even when the word included in the new message D2 is not included in the keyword dictionary, the information processing device 1 is capable of identifying a similar word as a keyword to be used in the model of estimating a forwarding destination if the similar word similar to the word is included in the keyword dictionary. Therefore, according to the information processing device 1, even in the case where the word included in the unknown message without a similar message in the past message storage unit 121 is an unknown word, it is possible to estimate a forwarding destination using the known keyword similar to the word.

Furthermore, a plurality of keywords included in the keyword dictionary of the keyword dictionary storage unit 122 is keywords used to create the model stored in the forwarding destination estimation model storage unit 125. As a result, according to the information processing device 1, it is possible to identify a keyword based on the words included in the new message D2 from among the keywords used to create the model for estimating a forwarding destination.

Furthermore, in the case of outputting the estimated forwarding destination, the information processing device 1 outputs information associated with the identified keyword. As a result, the user is enabled to check the information associated with the identified keyword for use in the model for estimating a forwarding destination. For example, the user is enabled to verify whether or not the forwarding destination is appropriately estimated on the basis of the information associated with the identified keyword.

Note that each of the illustrated components in each of the devices is not necessarily physically configured as illustrated in the drawings. For example, the specific aspects of distribution and integration of the respective devices are not limited to the illustrated aspects, and all or some of the devices may be functionally or physically distributed and integrated in any unit in accordance with various loads, use status, and the like.

For example, although the information processing device 1 according to the present embodiment includes the learning unit 14, the learning unit 14 may be implemented by another information processing device. In this case, the storage unit 12 stores data obtained during learning by the another information processing device.

Furthermore, various processing functions of the message reception unit 10, the estimation unit 11, the output unit 13, and the learning unit 14 executed in the information processing device 1 may be entirely or optionally partially executed in a central processing unit (CPU) (or a microcomputer such as a microprocessor unit (MPU) or a micro controller unit (MCU)) as an exemplary control unit. Furthermore, it is needless to say that whole or any part of the various processing functions may be executed by a program to be analyzed and executed in a CPU (or microcomputer such as MPU or MCU) or in hardware by wired logic. Furthermore, various processing functions executed with the information processing device 1 may be executed by a plurality of computers in cooperation through cloud computing.

Figure 15:
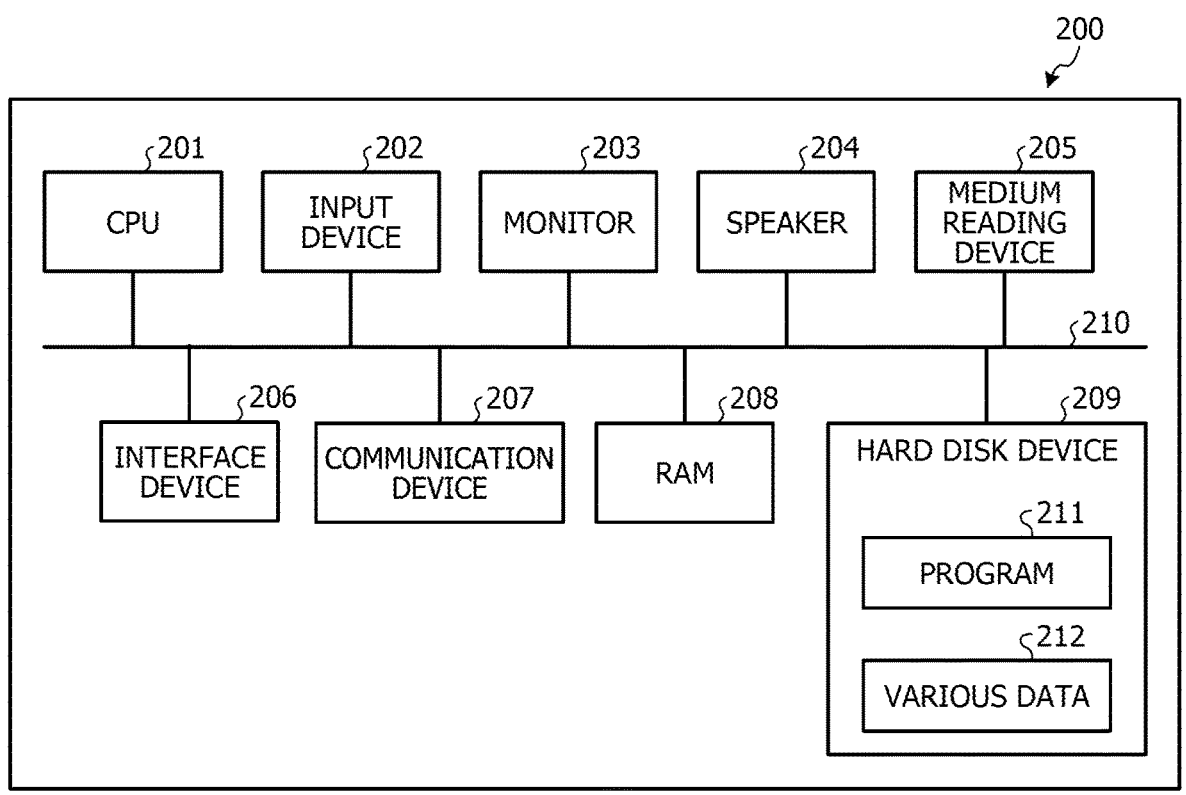
FIG. 15 is an explanatory diagram illustrating an exemplary computer configuration.

Meanwhile, the various types of processing described in the above embodiment may be implemented by execution of a prepared program in a computer. Thus, hereinafter, an exemplary computer configuration (hardware) that executes a program having functions similar to the above embodiment will be described. FIG. 15 is an explanatory diagram illustrating an exemplary computer configuration.

As illustrated in FIG. 15, a computer 200 includes a CPU 201 that executes various types of arithmetic processing, an input device 202 that receives data input, a monitor 203, and a speaker 204. Furthermore, the computer 200 includes a medium reading device 205 that reads a program and the like from a storage medium, an interface device 206 to be connected to various devices, and a communication device 207 to be connected to and communicate with an external device in a wired or wireless manner. Furthermore, the information processing device 1 further includes a random access memory (RAM) 208 that temporarily stores various types of information, and a hard disk device 209. Furthermore, each of the units (201 to 209) in the computer 200 is connected to a bus 210.

The hard disk device 209 stores a program 211 for executing various kinds of processing in the functional configuration (e.g., message reception unit 10, estimation unit 11, output unit 13, and learning unit 14) described in the above embodiment. Furthermore, the hard disk device 209 stores various data 212 that the program 211 refers to. The input device 202 receives, for example, an input of operation information from an operator. The monitor 203 displays, for example, various screens operated by the operator. The interface device 206 is connected to, for example, a printing device or the like. The communication device 207 is connected to a communication network such as a local area network (LAN), and exchanges various types of information with an external device via the communication network.

The CPU 201 reads the program 211 stored in the hard disk device 209, loads it in the RAM 208 and execute it, thereby performing various kinds of processing related to the functional configuration described above (e.g., message reception unit 10, estimation unit 11, output unit 13, and learning unit 14). Note that the program 211 may not be prestored in the hard disk device 209. For example, the computer 200 may read the program 211 stored in a readable storage medium to execute it. The storage medium that is readable by the computer 200 corresponds to, for example, a portable recording medium such as a compact disk read only memory (CD-ROM), a digital versatile disk (DVD), or a universal serial bus (USB) memory, a semiconductor memory such as a flash memory, a hard disk drive, or the like. Furthermore, the program 211 may be prestored in a device connected to a public line, the Internet, a LAN, or the like, and the computer 200 may read out the program 211 from the device to execute it.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium storing an estimation program that causes a processor included in a computer to execute a process, the process comprising:
   receiving a message of an estimation target of a forwarding destination;
   searching past messages for a similar message similar to the received message;
   calculating similarity between the message and the similar message;
   determining whether the similarity exceeds a threshold value;
   outputting, when the similarity exceeds a threshold value, a forwarding destination of the similar message as the forwarding destination of the message;
   estimating, when the similarity does not exceed the threshold value, the forwarding destination of the message using a model of estimating the forwarding destination based on a keyword that is identified based on a word included in the received message; and
   outputting the forwarding destination which is estimated.

2. The non-transitory computer-readable recording medium according to claim 1, wherein the estimating includes identifying the word as a keyword when the word is included in a keyword dictionary in which a plurality of keywords is set.

3. The non-transitory computer-readable recording medium according to claim 2, wherein the estimating includes identifying the similar word as a keyword when the word is not included in the keyword dictionary and a similar word similar to the word is included in the keyword dictionary.

4. The non-transitory computer-readable recording medium according to claim 2, wherein the plurality of keywords included in the keyword dictionary comprises a keyword used to create the model.

5. The non-transitory computer-readable recording medium according to claim 1, wherein the outputting includes outputting information associated with the identified keyword in a case of outputting the estimated forwarding destination.

6. An estimation method comprising:
   receiving a message of an estimation target of a forwarding destination;
   searching past messages for a message similar to the received message;
   calculating similarity between the message and the similar message;
   determining whether the similarity exceeds a threshold value;
   outputting, when the similarity exceeds a threshold value, a forwarding destination of the similar message as the forwarding destination of the message;
   estimating, when the similarity does not exceed the threshold value, the forwarding destination of the message using a model of estimating the forwarding destination based on a keyword that is identified based on a word included in the received message; and
   outputting the forwarding destination which is estimated.

7. The estimation method according to claim 6, wherein the estimating includes identifying the word as a keyword when the word is included in a keyword dictionary in which a plurality of keywords is set.

8. The estimation method according to claim 7, wherein the estimating includes identifying the similar word as a keyword when the word is not included in the keyword dictionary and a similar word similar to the word is included in the keyword dictionary.

9. The estimation method according to claim 7, wherein the plurality of keywords included in the keyword dictionary comprises a keyword used to create the model.

10. The estimation method according to claim 6, wherein the outputting includes outputting information associated with the identified keyword in a case of outputting the estimated forwarding destination.

11. An information processing device comprising:
a receiver configured to receive a message of an estimation target of a forwarding destination; and
a processor configured to:
search past messages for a message similar to the received message,
calculate similarity between the message and the similar message;
determine whether the similarity exceeds a threshold value;
output, when the similarity exceeds a threshold value, a forwarding destination of the similar message as the forwarding destination of the message;
estimate, when the similarity does not exceed the threshold value, the forwarding destination of the message using a model of estimating the forwarding destination based on a keyword that is identified based on a word included in the received message, and
output the forwarding destination which is estimated.

12. The information processing device according to claim 11, wherein the processor identifies the word as a keyword when the word is included in a keyword dictionary in which a plurality of keywords is set.

13. The information processing device according to claim 12, wherein the processor identifies the similar word as a keyword when the word is not included in the keyword dictionary and a similar word similar to the word is included in the keyword dictionary.

14. The information processing device according to claim 12, wherein the plurality of keywords included in the keyword dictionary comprises a keyword used to create the model.

15. The information processing device according to claim 11, wherein the processor outputs information associated with the identified keyword in a case of outputting the estimated forwarding destination.

* * * * *